United States Patent
Jaap et al.

(10) Patent No.: US 10,396,689 B2
(45) Date of Patent: Aug. 27, 2019

(54) PCB-BASED MOTOR STARTER

(71) Applicant: ROCKWELL AUTOMATION TECHNOLOGIES, INC., Mayfield Heights, OH (US)

(72) Inventors: Andrew John Jaap, Sheboygan Falls, WI (US); Michael Lee Gasperi, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/692,595

(22) Filed: Aug. 31, 2017

(65) Prior Publication Data
US 2019/0044461 A1 Feb. 7, 2019

Related U.S. Application Data

(60) Provisional application No. 62/541,458, filed on Aug. 4, 2017.

(51) Int. Cl.
| | | |
|---|---|---|
| *H01P 1/10* | (2006.01) | |
| *H02P 1/10* | (2006.01) | |
| *H02K 11/26* | (2016.01) | |
| *H02K 11/27* | (2016.01) | |
| *H02K 11/33* | (2016.01) | |

(Continued)

(52) U.S. Cl.
CPC .............. *H02P 1/10* (2013.01); *H01H 9/563* (2013.01); *H01H 47/223* (2013.01); *H02K 11/26* (2016.01); *H02K 11/27* (2016.01); *H02K 11/33* (2016.01); *H02P 1/26* (2013.01); *H02K 2211/03* (2013.01)

(58) Field of Classification Search
CPC ........... H02P 1/10; H02K 11/33; H02K 11/26; H02K 11/27; H02K 2211/03; H01H 47/223
USPC .......................................................... 318/430
See application file for complete search history.

(56) References Cited

U.S. PATENT DOCUMENTS 4,064,485 A * 12/1977 Leyde .................... G01R 21/00
307/39
5,440,180 A 8/1995 Devault et al.
(Continued)

FOREIGN PATENT DOCUMENTS

EP 2787518 A2 10/2014

OTHER PUBLICATIONS

Zhou et al; "Asynchronous Modular Contactor for Intelligent Motor Control Applications;" IEEE Transactions on Components and Packaging Technologies; vol. 32, No. 1; Mar. 1, 2009.

(Continued)

*Primary Examiner* — Kawing Chan
(74) *Attorney, Agent, or Firm* — Fletcher Yoder, P.C.

(57) ABSTRACT

A PCB motor controller comprises relays mounted on a PCB and interconnected to power traces in or on the PCB to receive incoming three-phase power and to output three-phase power to a motor. Control power traces in or on the PCB connect the relays to control circuitry, also mounted on the PCB. A power supply is mounted on the PCB and connected to the control circuitry to provide power for its operation and for switching of the relays. The relays are switched in accordance with a point-on-wave (POW) switching scheme, allowing for the use or relays and the PCB, which may not otherwise be suitable for motor control applications.

19 Claims, 9 Drawing Sheets

(51) Int. Cl.
*H01H 47/22* (2006.01)
*H01H 9/56* (2006.01)
*H02P 1/26* (2006.01)

(56) References Cited

U.S. PATENT DOCUMENTS

| | | | | |
|---|---|---|---|---|
| 2014/0265995 | A1* | 9/2014 | Kinsella | H02P 1/26 318/778 |
| 2015/0372483 | A1* | 12/2015 | Hertz | H01H 85/046 361/57 |
| 2016/0133414 | A1* | 5/2016 | Bock | H01H 47/002 361/187 |
| 2016/0134210 | A1 | 5/2016 | Bock et al. | |
| 2016/0134224 | A1* | 5/2016 | Bock | H01H 47/002 318/473 |
| 2016/0178687 | A1* | 6/2016 | Yamamoto | G01R 31/327 324/538 |

OTHER PUBLICATIONS

Sharma; "Quad Channel Relay Board;" http://www.electronics-lab.com/wp-content/uploads/2016/06/4-Channel-Relay-Board.pdf; Dec. 31, 2005.
Omron et al.; "G2R-PCB Power Relay;" http://www.edata.omron.com.au/eData/Relays/K013-E1-18.pdf; Feb. 1, 2007.
European Search Report for EP18187233.4 dated Dec. 13, 2018; 11 pages.
European Search Report for EP18187329.0 dated Dec. 13, 2018; 11 pages.
European Search Report for EP18187236.7 dated Dec. 17, 2018; 16 pages.
Extended European Search Report for Application No. 18187236.7 dated Mar. 19, 2019, 16 pages.

* cited by examiner

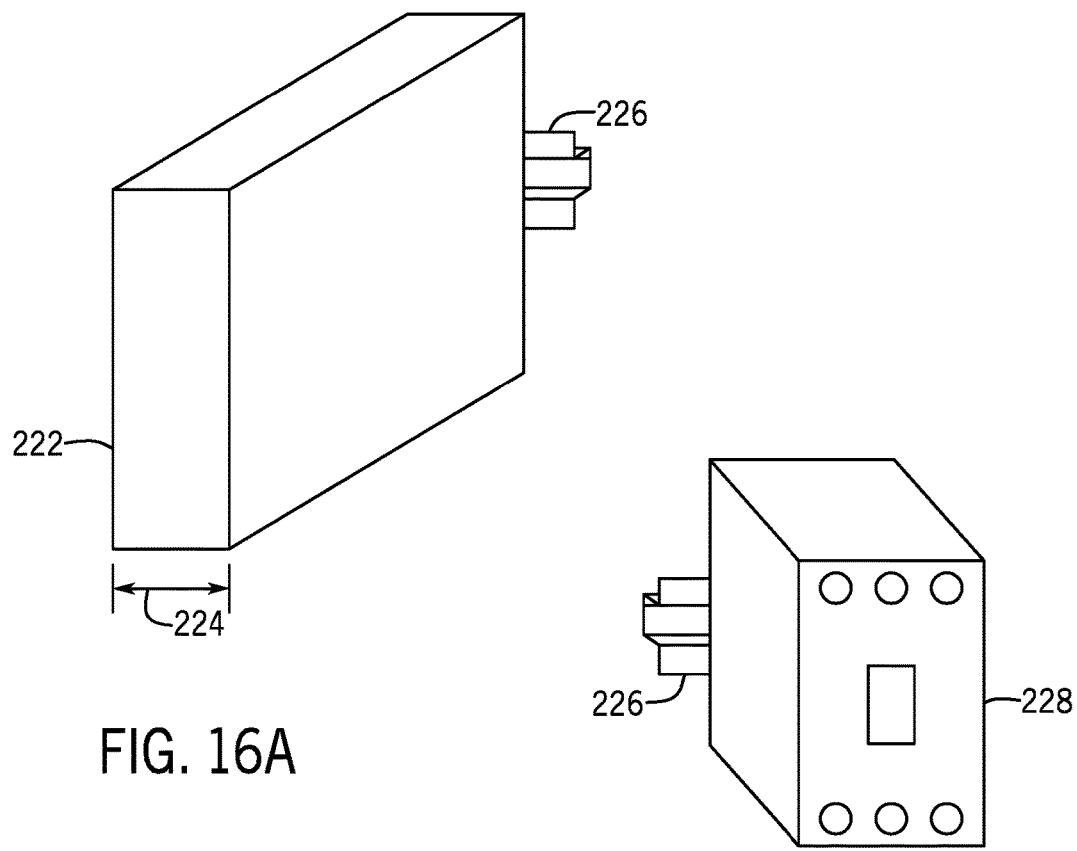
FIG. 16A
FIG. 16B
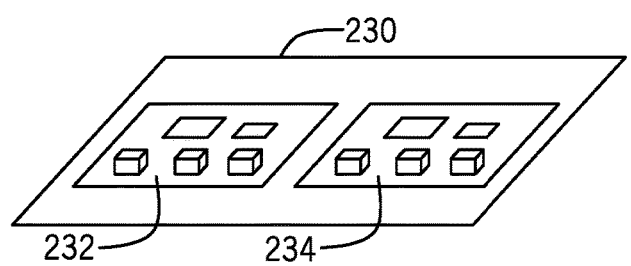
FIG. 16C
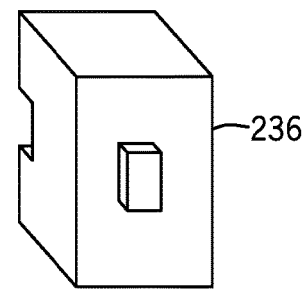
FIG. 16D

PCB-BASED MOTOR STARTER

CROSS-REFERENCE TO RELATED APPLICATIONS

This application claims priority from and the benefit of U.S. Provisional Application Ser. No. 62/541,458, entitled "PCB Motor Controller with POW Switching," filed Aug. 4, 2017, which is hereby incorporated by reference in its entirety.

BACKGROUND

The present disclosure relates generally to motor controllers, and more particularly to a motor controller that utilizes point on wave switching and that may be configured on a circuit board implementation.

Many different configurations of devices have been developed for starting and stopping motors, particularly those used in industrial applications. Most such applications require three-phase power for AC induction motors. The type of control provided may vary, but typically includes so-called "across the line" starters, soft starters, and other devices that start and stop the motors under the command of a human operator or automation controllers.

Cost and complexity of such devices has tended to depend on the features provided, the components utilized, and so forth. In recent years, so-called "hybrid" devices have been developed that reduce the package size, but are based on the use of solid-state switches, which can be expensive and offer little further advancement in cost or packaging.

There is a need, therefore, for a new paradigm for motor controllers that departs from conventional approaches and allows for market-changing product offerings while providing highly reliable devices adapted to multiple motor applications.

BRIEF DESCRIPTION

The present disclosure describes systems and methods designed to address such needs. In accordance with certain aspects of the disclosure, a motor starter comprises a printed circuit board having three phase conductors for conveying incoming three phase power from a source and for outputting three phase power to a three-phase AC electric motor, and control circuitry mounted on and electrically coupled to the printed circuit board and receiving power from a power supply. Three single pole relays are mounted on and electrically coupled to respective phase conductors to receive the incoming power and to provide the outgoing power when closed based upon signals from the control circuitry to start the electric motor.

In accordance with another aspect, a motor starter comprises a printed circuit board having three phase conductors for conveying incoming three phase power from a source and for outputting three phase power to a three-phase AC electric motor, control circuitry mounted on and electrically coupled to the printed circuit board and receiving power from a power supply, and three single pole relays mounted on and electrically coupled to respective phase conductors to receive the incoming power and to provide the outgoing power when closed based upon signals from the control circuitry to start the electric motor. The control circuitry is configured to close and open the relays in accordance with a point-on-wave switching scheme based upon sensed parameters of current and/or voltage of the incoming three phase power.

The disclosure also sets forth a motor starter comprising a printed circuit board having three phase conductors for conveying incoming three phase power from a source and for outputting three phase power to a three-phase AC electric motor, a power supply mounted on and electrically coupled to the printed circuit board, and control circuitry mounted on and electrically coupled to the printed circuit board and receiving power from the power supply. Three single pole relays are mounted on and electrically coupled to respective phase conductors to receive the incoming power and to provide the outgoing power when closed. The relays each have a direct current operator that receives control signals from the control circuitry to switch in accordance with a point-on-wave switching scheme to close at desired times of an AC waveform of the incoming power and thereby complete current carrying paths from the source through the power conductors to the motor. The control circuitry is programmed to monitor a switching polarity of at least one of the phases of incoming power and to control timing for closing and/or opening of at least one of the relays based upon the monitored polarity.

DRAWINGS

These and other features, aspects, and advantages of the present invention will become better understood when the following detailed description is read with reference to the accompanying drawings in which like characters represent like parts throughout the drawings, wherein:

FIGS. 16A-16D are illustrations of certain presently contemplated packaging and form factors for the PCB motor controllers.

DETAILED DESCRIPTION

Figure 1:
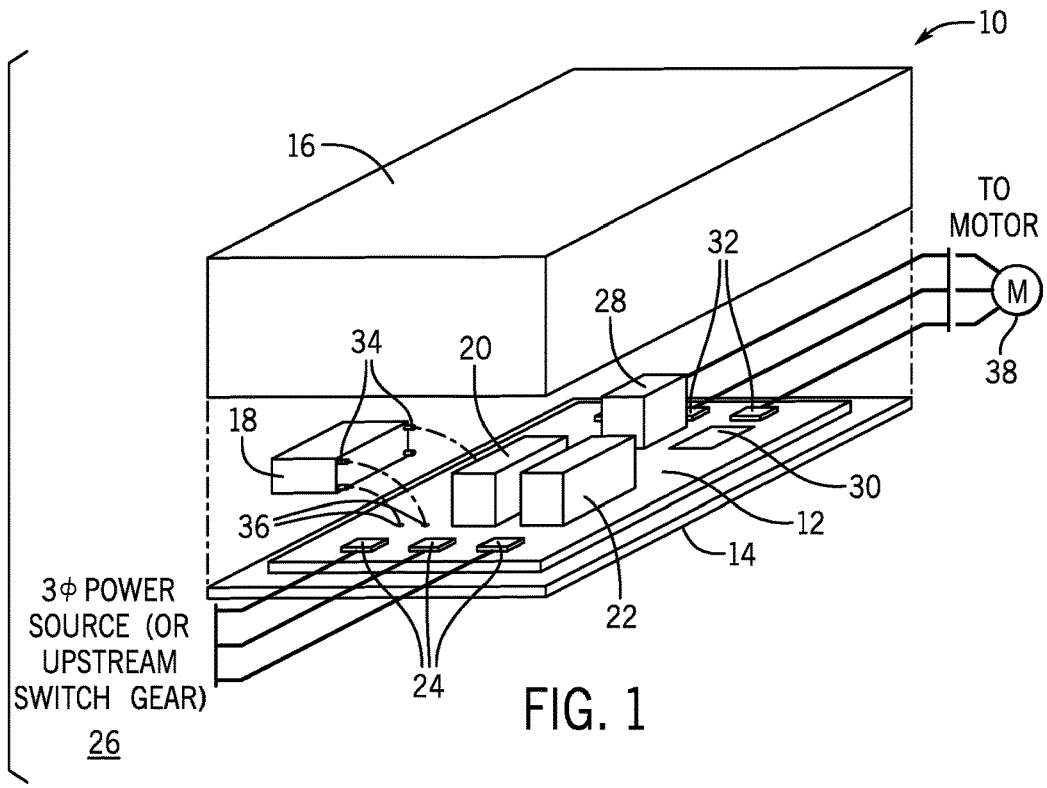
FIG. 1 is a perspective view of an example PCB motor controller in accordance with the present disclosure.

FIG. 1 illustrates an example motor controller 10 that comprises a PCB-based contactor or relay structure and that utilizes POW switching. The controller 10 comprises a PCB 12 that supports the controller components as discussed below, and that provides routing for power, data and control signals during operation (eliminating or reducing the need for other wiring or connections). The controller may be packaged in a manner that conforms to industry standards for automation devices of this type, and particularly for three-phase, 208, 230, or 460 VAC motor controller and starter applications. In the illustrated embodiment, the PCB and its mounted components are supported on a base 14 and will be covered by a housing or enclosure 16 that mates with the base. Many variations and specific arrangements may be envisioned by those skilled in the art, such as DIN rail mounted enclosures, enclosures adapted to be mounted on or near the driven motor, enclosures adapted to be mounted with other system components (e.g., in motor control centers), and so forth. However, it is contemplated that the embodiments illustrated may be made smaller and lighter than existing motor controllers and starters, at least in part due to the use of PCB-mounted relays in combination with POW switching that allows for the use of relays that otherwise would be unsuitable for the motor control tasks described.

In the embodiment shown in FIG. 1, three relays 18, 20, and 22 are mounted to the PCB and are electrically coupled to other circuit components through the PCB. In particular, as discussed below, the relays have control connections that permit them to be automatically opened and closed (i.e., their conductive state changed) by control signals applied through control connections. Each relay is therefore connected, through the PCB, to line-side terminals 24 that allow for the controller to be coupled to a source of three-phase power (e.g., from the power grid, a generator, or any other power source, and through any desired upstream components or switchgear, such as fuses, disconnects, etc.).

A power supply, indicated generally by reference numeral 28, is also coupled to the PCB 12, and provides power for operation of control circuitry 30 through the PCB. As discussed below, the power supply, which may receive incoming power from one or more of the phases of power provided through the terminals 24, may convert the incoming power to regulated power (e.g., DC power) used by the control circuitry for monitoring, computing, and control functions, including signals applied to the relays 18, 20, and 22 to change their state. Three-phase power is then output by the relays via load-side terminals 32, also through the PCB. The connections to the relays themselves may be through pins or tabs 34 provided in and extending from the packaging of the relays, which enter into and are electrically coupled to vias or holes 36 in the PCB (e.g., by soldering). Through operation of the power supply, the control circuitry, and ultimately the relays, three-phase power is received by the controller, its application to a motor 38 is controlled through POW switching.

The relays may be of any suitable type and construction, though it is presently contemplated that off-the-shelf, commercially available relays may be used that are ordinarily not rated for motor control, or for inrush currents that would ordinarily be experienced in three-phase motor control applications. As will be appreciated by those skilled in the art, in such applications, upon initial application of power to the motor and as the motor is brought up to its rated speed, inrush currents many times the rated currents may be encountered. The relays employed on the present PCB-based controller may be ordinarily rated for other applications, but it has been found that they may operate, receive, and provide power for motor starting and control by appropriate switching in accordance with a POW scheme as outlined below. Example relays may be rated for switching currents of at most 16 A (or 20 A) at 250 VAC, although other ratings may, of course be used. The relays may be pre-packaged subassemblies each having a housing with bottom-extending contacts mounting on the printed circuit board to receive the control signals, to receive the incoming power, and to output the outgoing power. In some embodiments, each of the relays may have a weight of at most about 15 grams, and a packaging or enclosure of no larger than about 45 mm long by 15 mm wide by 30 mm tall. Such relays are commercially available from many sources, such as Finder of Almese, Italy under the commercial designation "45 series", and Omron of Kyoto, Japan under the commercial designation G2RL.

Figure 2A:
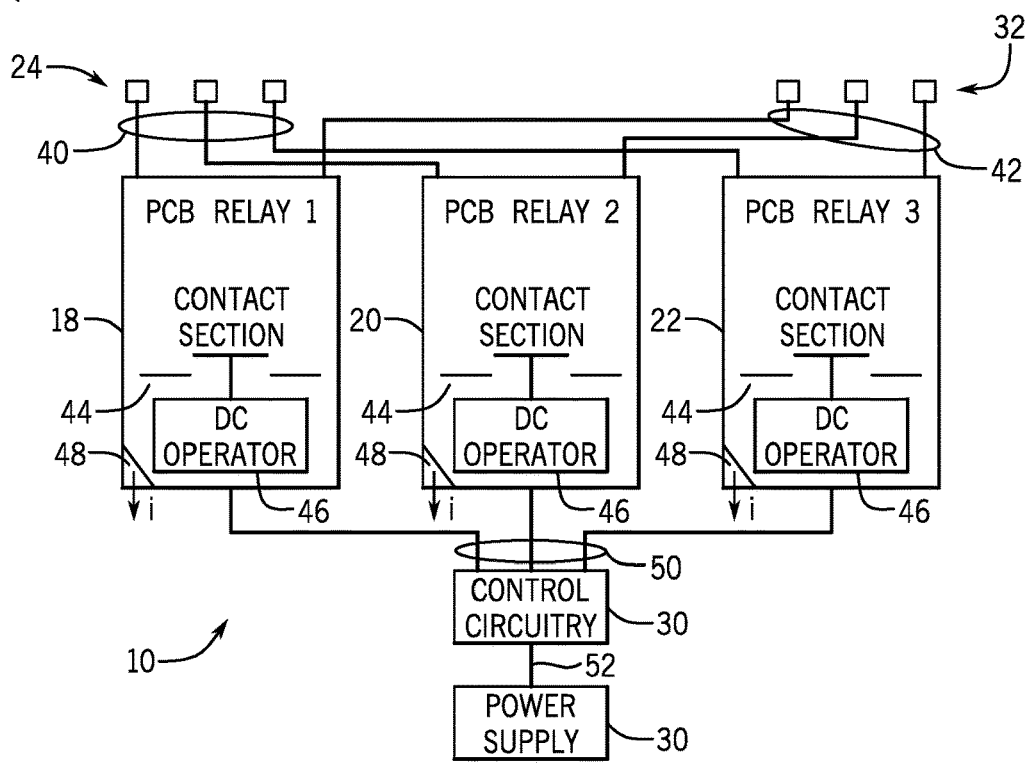
FIGS. 2A and 2B are diagrammatical overviews of an PCB motor controller and connections in such a device in accordance with the present disclosure.

FIG. 2A illustrates the PCB-based motor controller 10 in a schematic representation. Here again, the illustrated embodiment comprises three relays 18, 20, and 22, coupled to control circuitry 30 and thereby to a power supply 28. To provide the three-phase incoming power to the relays, conductive traces 40 are provided in or on the PCB and between the input terminals 24 and the relays. Similarly, conductive traces 42 are provided in or on the PCB between the output terminals 32 and the relays. The traces may be made by conventional PCB manufacturing techniques (e.g., plating, etching, layering, drilling, etc.).

Each relay may be an electromechanical device that completes a single current carrying path (and interrupt the path) under the control of an electromagnetic coil structure. In the illustration of FIG. 2A, the major components of the relays are illustrated as including a contact section 44 and a DC operator 46. The contact section may typically comprise at least one movable contact and at least one stationary contact (while the representation of FIG. 2A shows a double-break implementation, in practice the relays may have a single movable contact). The movable contact is displaced under the influence of a magnetic field created by energization of a coil of the operator via control signals provided by the control circuitry. Each relay may also comprise a current sensor 48 that allows for detection of currents of the incoming (and/or outgoing) power. In some embodiments, the current sensor may be a separate component that is associated with the traces that provide power from the line-side terminals to the relays (or that provide power from the relays to the load-side terminals). The current signals are used to control POW switching of the relays as discussed below. As also shown in FIG. 2A, conductive traces 50 are provided in or on the PCB to electrically couple the operators of the relays to the control circuitry. These traces will typically be differently sized and spaced than the power traces 40 and 42 owing to the lower voltage and current levels of the control signals. Finally, traces 52 will be provided in or on the PCB to allow power to be provided between the power supply 28 and the control circuitry. It should be noted that in some embodiments, additional monitoring, programming, data communication, feedback, and so forth may be performed by the components of the PCB-based motor controller, and in such cases, all signals may be provided and exchanged by additional conductive traces formed in or on the PCB.

Figure 2B:
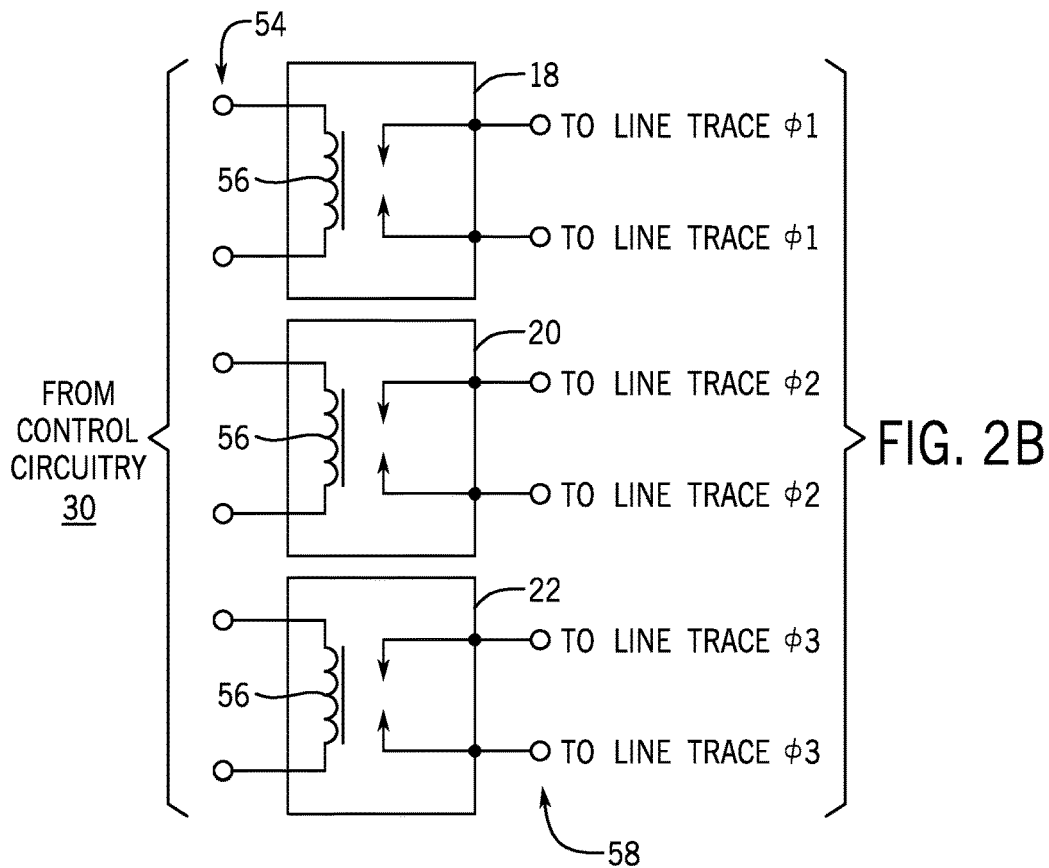

FIG. 2B is another schematic diagram of the relays of the PCB-based motor controller. In this view, the relays 18 20, and 22 are shown as they might be placed and coupled to the PCB. Control pins 54 are shown that would be electrically coupled (e.g., soldered) to the control traces of the PCB (or to plated vias, for example, in electrical continuity with the traces). Within the relays, the pins are coupled to either side of a control coil 56 of the respective operator. These coils are electromagnetically linked to the contacts as discussed above, which are, in turn, coupled to power pins 58. Here again, the power pins will be electrically coupled (e.g., soldered) to the power traces of the PCB (or to plated vias, for example, in electrical continuity with the traces). It may be noted that the relays in certain presently contemplated embodiments are single-pole, single-throw devices for their simplicity and cost-effectiveness.

Figure 3:
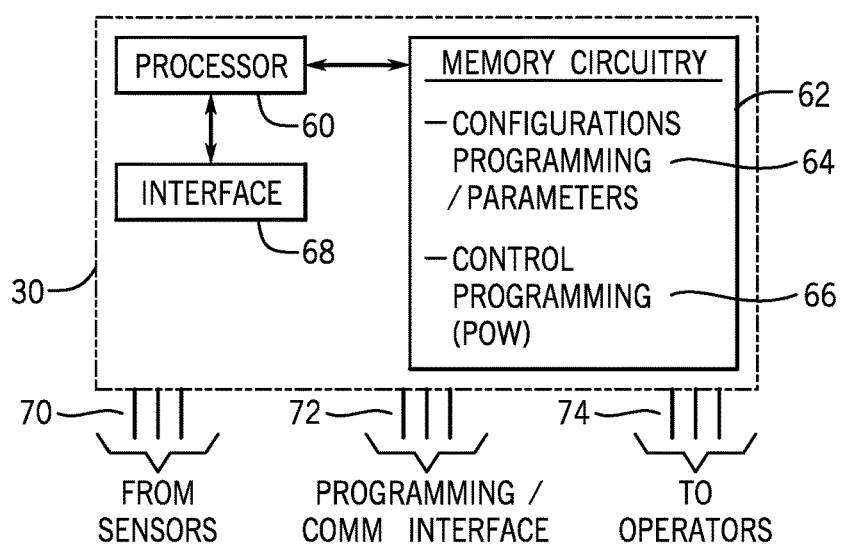
FIG. 3 is a diagrammatical view of example control circuitry for a PCB motor controller of the previous figures.

As noted above, the use of off-the-shelf relays that would otherwise be underrated for and unsuitable for motor control applications is afforded by POW switching under the control of the control circuitry. FIG. 3 illustrates certain components of the control circuitry. As shown, the control circuitry comprises one or more processors 60 that, in operation, execute programmed instructions for monitoring the incoming power (and where desired the outgoing power), and based upon timing developed from such monitoring, issues signals to control energization of the relay coils. The programming code executed by the processor will typically be stored in memory circuitry 62. The memory circuitry may be of any suitable types, and multiple memories may be used when desired. Among the programming code and data stored in the memory circuitry will be configuration programming and parameters 64, such as electrical angles for switching, timing parameters, set points, and so forth. Control programming 66 for POW control of the relays is also stored in the memory and executed by the processor. One or more interfaces 68 may be provided, such as for the exchange of signals with the sensors (including, where necessary for digitization of the signals), with external components and circuits (such as for programming, monitoring, reporting, etc.), with the relay coils (for providing the power signals), and so forth. The control circuitry will be provided with conductors or "pinouts" for communicating with such other devices via the conductive traces of the PCB. In the illustration of FIG. 3, these include conductors 70 for receiving sensor (e.g., current sensor) data, conductors 72 for exchanging data with a programming or communications interface (e.g., in the event the controller is equipped for such communication), and conductors 74 for providing the control signals to the relays.

For the POW control, the control circuitry programming allows for monitoring of one or more characteristics of one or more of the phases of the incoming power, and then for causing switching of the relays based upon timing developed from such monitoring. For example, it may be advantageous to close (or "make") two of the relays at or near a desired phase-to-phase voltage relationship (e.g., peak) of incoming power. The other relay may be closed ("made") at a desired time thereafter. Such switching will reduce transient characteristics that could otherwise occur and that might overpower the relays. To allow for controlled switching of the relays, the control signals may be DC signals (that is, not relying upon a sinusoidal waveform for application of power to the operators). For opening ("breaking") the relays, a similar POW scheme may be used, in which one of the relays is first opened based upon timing developed from monitoring of the current for that phase, such as based on a zero-crossing, and thereafter the other phases are opened.

Figure 4A:
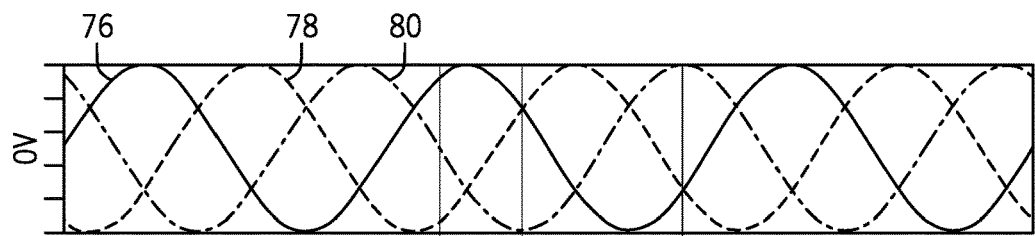
FIGS. 4A-4C are graphical representations of example phase voltages and currents for a PCB motor controller during closing of switching devices.
Figure 4B:
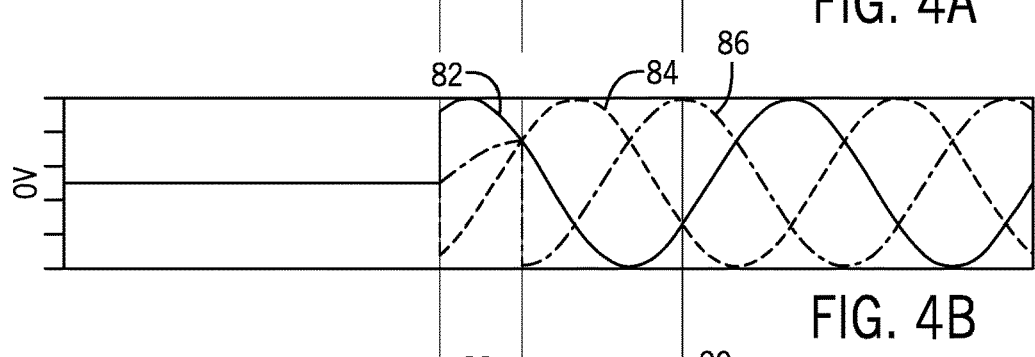
Figure 4C:
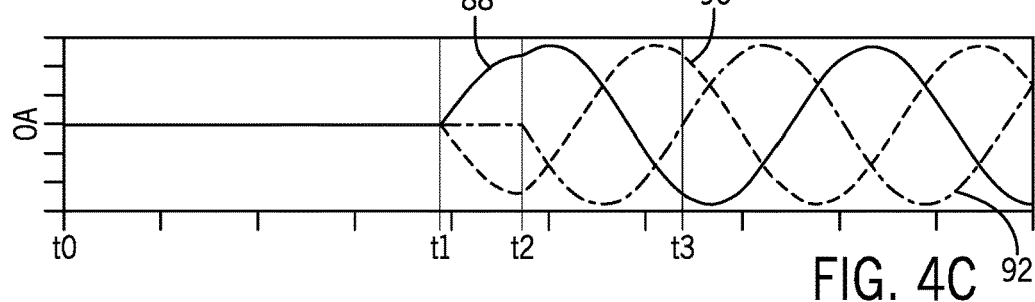

To help illustrate, closing the switching devices to provide three-phase electric power to the motor is illustrated in FIGS. 4A-4C. FIG. 4A illustrates the voltage of three-phase electric power (e.g., a first phase voltage curve 76, a second phase voltage curve 78, and a third phase voltage curve 80) provided by a power source. FIG. 4B illustrates the line to neutral voltage supplied to each terminal (e.g., first terminal voltage curve 82, second terminal voltage curve 84, and third terminal voltage curve 86) of the motor. FIG. 4C illustrates line current supplied to each winding (e.g., first winding current curve 88, second winding current curve 90, and third winding current curve 92) of the motor. As described above, the waveforms depicted in FIGS. 4A-4C may be determined by control circuitry based on measurements collected by the sensors.

As depicted, between t0 and t1, electric power is not connected to the motor. In other words, all of the relays are open. At t1, one or more relays are closed to start current flow from the power source in two phases to the motor. To minimize inrush current and/or current oscillations, a first phase and a second phase are connected based upon a predicted or sensed timing as determined from the monitored waveforms. Accordingly, as depicted in FIG. 4A, the first phase and the second phase are connected when the line-to-line voltage of the first phase (e.g., first phase voltage curve 76) and the second phase (e.g., a second phase voltage curve 78) is at a maximum. Once connected, the first phase of the electric power flows into the first winding of the motor, the second phase of the electrical flows into the second winding of the motor, and the third winding of the motor is at an internal neutral (e.g., different from line neutral), as depicted in FIG. 4B. Additionally, since the two phases are connected at a predicted or sensed point, the current supplied to the first winding (e.g., first winding current curve 88) and the second winding (e.g., second winding current curve 90) start at zero and gradually increase, as depicted in FIG. 4C, thereby reducing magnitude of in-rush current and/or current oscillations supplied to the first and second windings.

After the first two phases are connected, at t2, the remaining relay is closed to connect a third phase of the electric power to the motor. Similar to the first phase and the second phase, to minimize inrush current and/or current oscillations, the third phase is also connected based upon a predicted current zero-crossing. Accordingly, as depicted in FIG. 4A, the third phase is connected when sum of line-to-line voltage between the first phase (e.g., first phase voltage curve 76) and the third phase (e.g., third phase voltage curve 80) and the line-to-line voltage between the second phase (e.g., second phase voltage curve 78) and the third phase (e.g., third phase voltage curve 80) is at a maximum (e.g., a predicted current zero-crossing), which occurs when the line-to-line voltage between the first phase and the second phase is at a minimum and third phase is at a maximum.

It should be noted that although the third phase is depicted as being connected at the first such subsequent occurrence, the third phase may additionally or alternatively be connected at any subsequent occurrence, for example at t3. Once connected, the third phase of the electric power flows into the third winding of the motor, as depicted in FIG. 4B. Additionally, since the third phase is connected based upon a predicted current zero-crossing, the third winding current 92 gradually changes from zero, as depicted in FIG. 4C, thereby reducing magnitude of in-rush current and/or current oscillations supplied to the third winding.

Additionally, as described above, controlling the breaking (e.g., opening) of the one or more switching devices may facilitate reducing likelihood and/or magnitude of arcing, which may strain and/or wear contacts and conductive structures in the relays and/or other connected components. As such, the one or more relays may be controlled such that they break based at least in part on a current-zero crossing (e.g., within a range slightly before to at the current zero-crossing across that relay).

Figure 5:
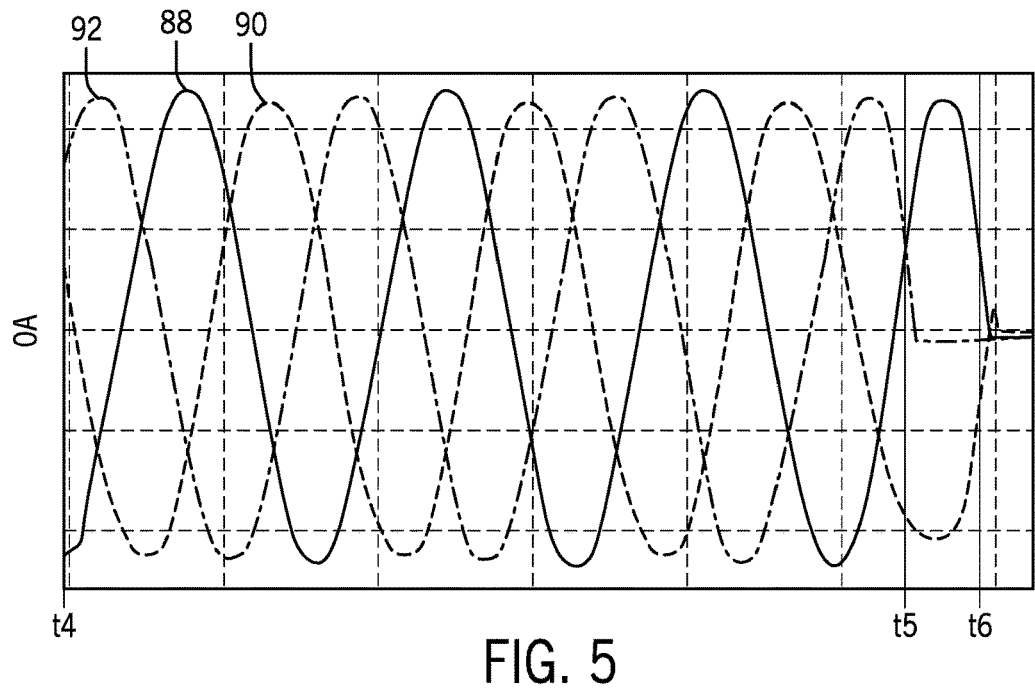
FIG. 5 is a graphical representation of example disconnecting of three-phase power to a motor.

To help illustrate, opening the switching devices to disconnect three-phase electric power from an motor is described in FIG. 5. More specifically, FIG. 5 depicts the current supplied to the windings (e.g., first winding current curve 88, second winding current curve 90, and third winding current curve 92) of the motor. As described above, the waveform depicted in FIG. 5 may be determined by control circuitry based on measurements collected by the sensors.

As depicted, prior to t4, electric power is connected to the motor. In other words, all of the relays are closed. At t5, one or more of the relays are opened to disconnect the third phase of the electric power from the motor. As described above, to minimize arcing, the third phase is disconnected based at least in part on a current zero-crossing in the third phase. Accordingly, as depicted, the third phase is disconnected when the current supplied to the third winding (e.g., third winding current curve 92) is approximately zero. Once disconnected, the current supplied to the second winding current the first winding current adjust to the removal of the third phase.

After the third phase is disconnected, the remaining relays are opened to disconnect the other two phases (e.g., the first phase and the second phase) of electric power to the motor at t6. Similar to disconnecting the third phase, to minimize arcing, the first phase is disconnected based at least in part on a current zero-crossing in the first phase and the second phase is disconnected based at least in part on a current zero-crossing in that phase. Accordingly, as depicted, the first phase and the second phase are disconnected when current supplied to the second winding (e.g., second winding current curve 90) and the first winding (e.g., first winding current curve 88) are approximately zero. Once disconnected, the electric power supplied to the motor begins to decrease. It should be noted that although the first phase and the second phase are depicted as being disconnected at the first subsequent current zero-crossing, the first and second phases may additionally or alternatively be disconnected at any subsequent current zero-crossings.

Figure 6:
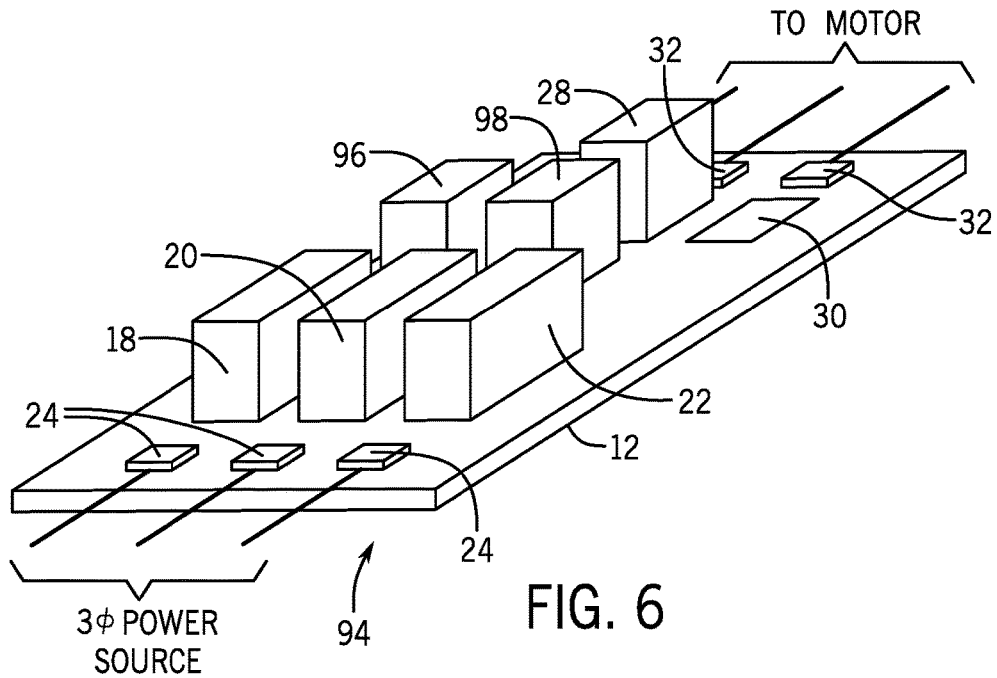
FIG. 6 is a perspective view of an example 5-relay PCB motor controller.
Figure 7:
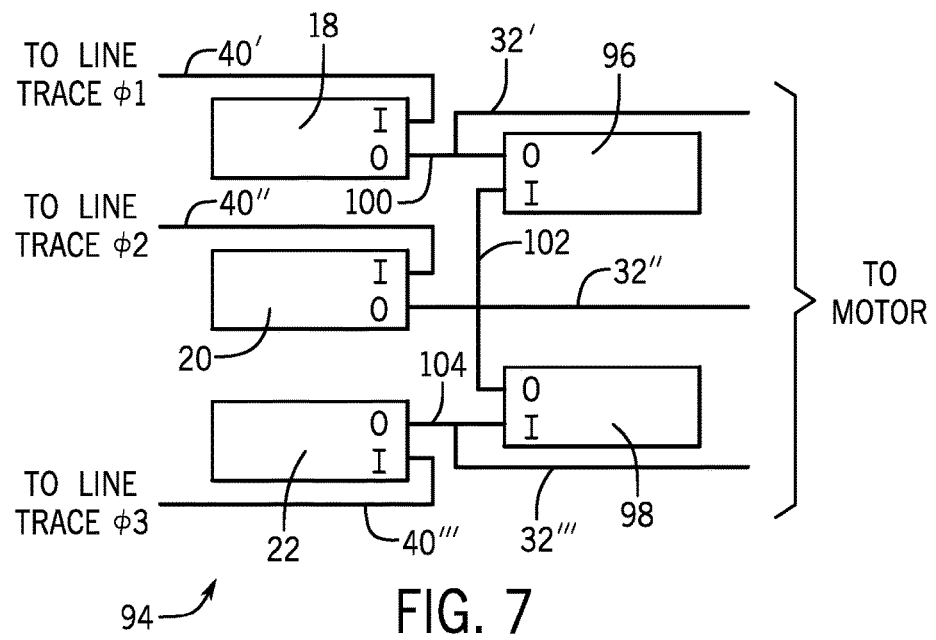
FIG. 7 is a diagrammatical illustration of the PCB motor controller of FIG. 6.

In addition to the three-relay motor controller discussed above, PCB-based motor controllers with POW switching schemes, according to the present disclosure, may be designed for a number of alternative approaches to motor starting and control. For example, 5, 6, 8, 9, and other numbers of relays may be mounted on and controlled via traces in the PCB for specific types of switching. FIGS. 6 and 7 illustrate an example of a 5-relay PCB-based motor controller 94 with POW switching, such as may be used for wye-delta starting and control. In the embodiment of FIG. 6, the PCB 12 supports and is interconnected to the original three relays discussed above that receive power from the line-side terminals and associated power traces in or on the PCB. However, here two additional relays 96 and 98 are provided that are also connected to power traces in or on the PCB. FIG. 7 illustrates an example how such interconnections of the relays may be made. As shown, relays 18, 20 and 22 are connected to power traces 40', 40" and 40'", respectively to receive three-phase power from the line-side terminals. Here, however, while the input to relay 18 is connected to the input power trace 40', its power output is connected to the output of relay 96 by a jumper trace 100, which is also connected to the power output trace 32' (which would in turn be coupled to one of the load-side terminals). The input of relay 20 is connected to the input power trace 40", while its output is connected via a jumper trace 102 to the input of relay 96 and to the output of relay 98. The jumper trace 102 is also connected to the power output trace 32". Finally, the input of relay 22 is connected to the input power trace 40'", while its output is connected to a third jumper trace 104 and to a third power output trace 32'". This arrangement allows for wye-delta POW switching by appropriate control of opening and closing of the five relays. An example of such switching is provided, for example, in U.S. published patent application no. 2016/0133413, which is hereby incorporated into the present disclosure by reference, in its entirety.

Figure 8:
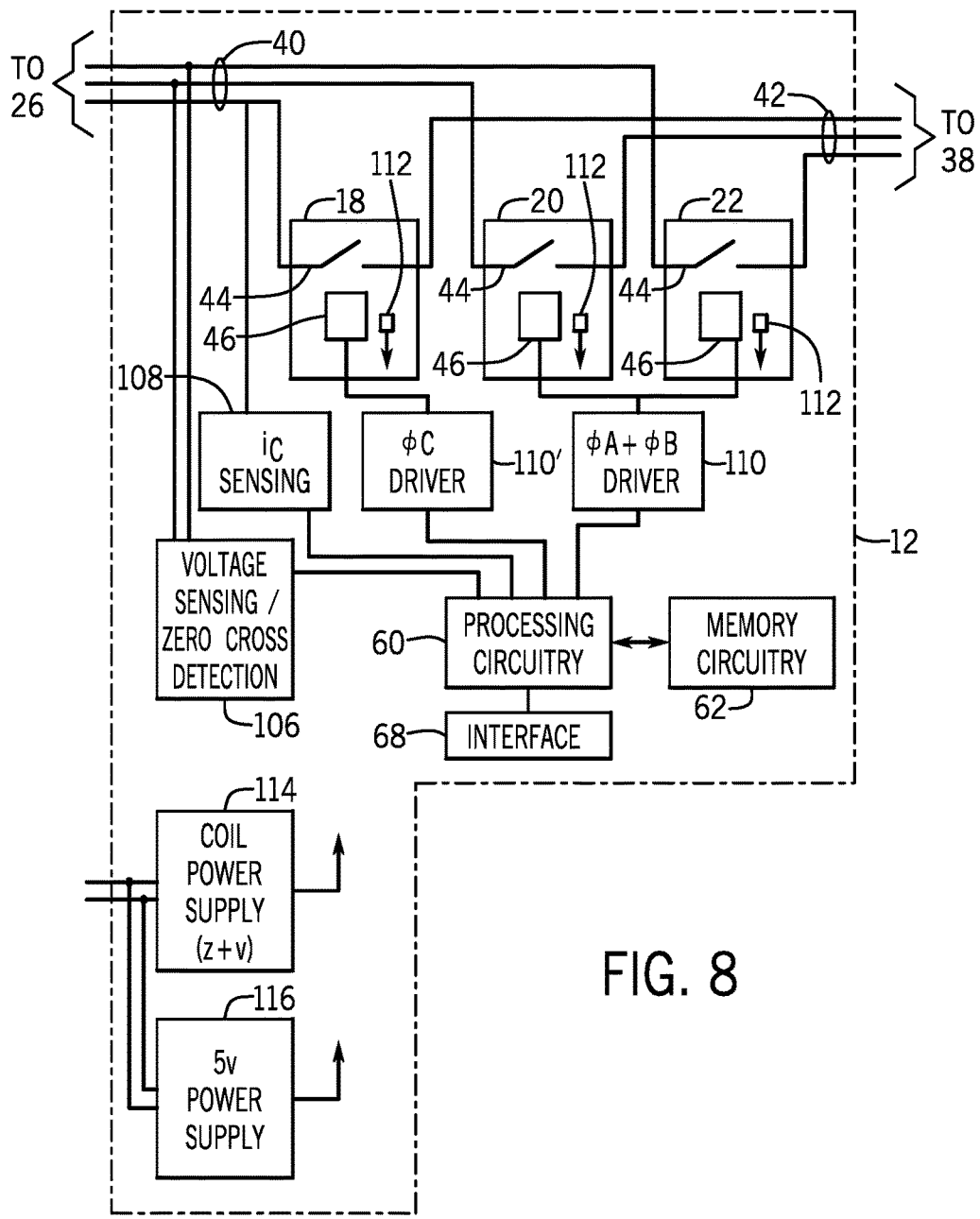
FIG. 8 is a further diagrammatical illustration of a presently contemplated arrangement of a PCB with circuit components for compact and efficient motor control.

There are a number of enhancements and unique circuit layouts that may be considered for packaging and interconnection of the components of PCB motor controllers in accordance with the present techniques. FIG. 8 illustrates an example layout for a PCB motor controller utilizing POW switching. As in the earlier illustrations, the circuit board is indicated by reference numeral 12, and the relays by 18, 20, and 22, respectively, for each phase of power. The power is channeled to the relays via line traces 40 formed in or on the PCB, and power is provided downstream for the motor via load traces 42. Here the contacts are illustrated at 44, and the illustrated relays each comprise a single movable contact that mates with a single stationary contact, although multiple parallel contacts could be used. The operator for each relay is here again indicated by reference numeral 46. Also, as in earlier illustrations, the processing circuitry for control of the relays is illustrated by reference numeral 60, and its associated memory by reference numeral 62. Interface circuitry for communicating with other components and local and remote devices is indicated by reference numeral 68.

In this embodiment, voltages are sensed for two of the phases of incoming power, which might be referred to here as ϕA and ϕB. A voltage sending/zero cross detection circuit 106 is coupled to traces that tie to the incoming power traces for these phases. In practice, all three voltages may be measured, although in the illustrated embodiment, and as described more fully below, the switching may based upon a phase-to-phase voltage difference that is determined by circuit 106. Similarly, the current of at least one phase of power is measured by a current sensing circuit 108. In the illustrated embodiment, only one phase current, ϕC is measured. In other embodiments more or all of the currents may be measured, and in some cases, all phases may be monitored together (e.g., for detection of faults, short circuits, etc.). The measured values are applied to the processing circuitry 60 (e.g., in raw form for digitization in the processor or associated circuitry, or digitized by analog-to-digital converters, not separately shown). As discussed below, closing of the switches may be based, for example, on the phase-to-phase voltage determined by circuit 106, while opening times may be based upon the phase current measured by circuit 108.

In the embodiment illustrated in FIG. 8, simplicity is further enhanced by reducing the number of driver circuits used to power the operators of the relays. In this case, a first driver 110 powers relays 20 and 22 for ϕA and ϕB. This is possible because the POW switching scheme calls for these relays to be switched at the same time, closing before the third phase, and opening after the third phase. A separate driver 110' is provided for ϕC.

Also illustrated in FIG. 8 are one or more temperature sensors 112 that may optionally be placed on, in, or near the relays. These sensors may measure temperature of one or more of the switching devices, and particularly to provide some indication of heating of the operator coil. Signals from the one or more temperature sensors may be received and processed by the processing circuitry to adjust power applied to the relays, such as to provide uniform timing of switching despite changes in temperature, as described below. FIG. 8 also shows power supplies, including a coil power supply 114, which may provide a standard voltage level for switching (e.g., 12 volts), as well as a low voltage power supply 116, such as for powering the processor and any logic circuits requiring power.

Figure 9:
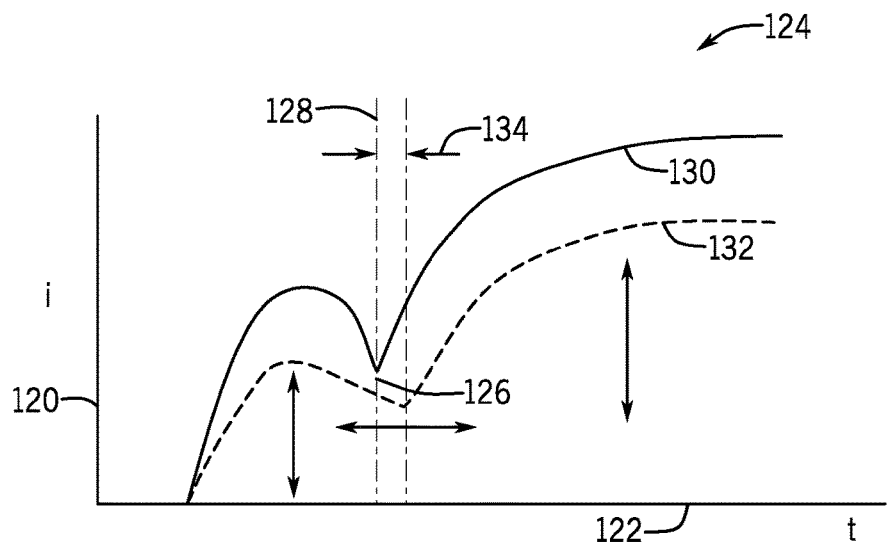
FIG. 9 is a graphically illustration of exemplary currents during closing of relays of certain PCB motor controllers and how control may be additionally based on temperature of an operator coil.
Figure 10:
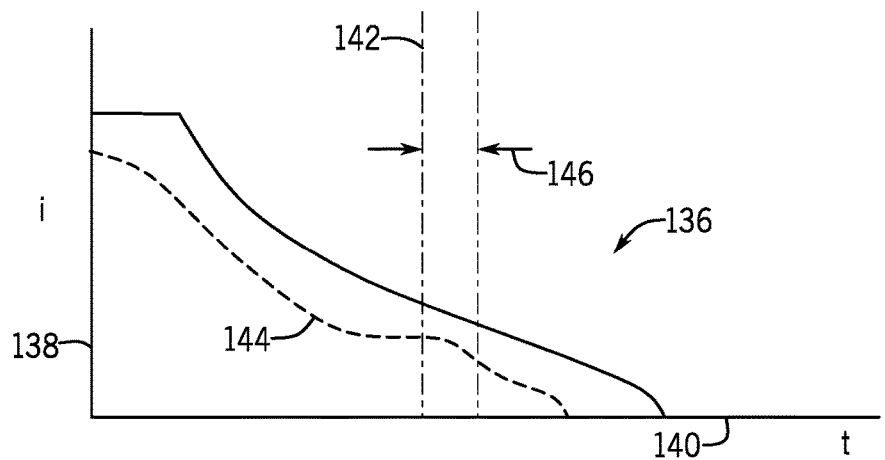
FIG. 10 is a similar graphical illustration of exemplary currents during opening of a relay of the device.

FIGS. 9 and 10 illustrate currents that may be experienced by the relay coils during closing and opening, respectively. In FIG. 9 the closing current 120 is shown over time along axis 122. The current trace 124 may include an initial increase shown to the left, followed by a decrease to a local dip 126. As indicated by time 128 for the solid trace 130, at a normal or reference temperature of the relay coil, the lowest point in this dip may correspond to contact of the pole faces of the relay (confirming closing of the contacts slightly before that time). Thereafter the current will rise until it reaches as steady state level, as indicated at reference numeral 130. In a currently contemplated embodiment, a relatively elevated voltage may be initially applied (e.g., 15 volts) to cause the relay to rapidly (and consistently) close, with a smaller current (e.g., 8 volts) being applied thereafter for holding the relay closed. These signals may be pulse width modulated where desired, but in present embodiments, the operators of the relays are provided with DC power to predictably control the timing of their operation.

The dashed trace 132 in FIG. 9 indicates different behavior of the relay due to heating of the operator coil. In general, the electrical properties of the coils may be affected by the temperature (e.g., resistance). This may cause the dip in current, corresponding to the closing of the relay, to shift, as indicated by time 134, and may also alter the initial and steady state current levels, as indicated by the arrows in FIG. 9. To counter such effects and to provide more consistent operation despite temperature changes, the input signals may be altered to raise (or lower) the currents and/or voltages applied, thereby maintaining the timing for closing at a stable location in time. This may be performed, for example, based on the sensed temperature of one or more of the relay coils, or of a temperature in some way related to or indicative of the coil temperature, and then applying a computed or stored relationship with the desired current and/or voltage inputs (e.g., a coil voltage and temperature or resistance relationship stored in a lookup table).

FIG. 10 shows a similar effect during opening. Here, the coil current 138 is again shown against time on axis 140. The current trace 136 shown in solid may represent the coil current at a nominal or reference temperature. The opening may be considered to occur at a time 142. As the coil is heated or cooled, the electrical properties and thus the current (for a given input signal) may here again change, as indicated by the dashed trace 144. Without compensation this may change the time of opening, as indicated at 146. To counter such effects, the input signals may be changed based upon sensed temperature to provide more uniform timing for opening.

In certain currently contemplated embodiments, POW switching allows for the use of smaller relays (and other components) than would be possible if POW switching were not used. Benefits of such switching include greatly reduced nefarious transitory effects on the controlled motor, as well as greatly reduced arcing and consequent degradation of the contacts of the relays. Tests have shown that a surprisingly extended life and numbers of cycles may be achieved even for relays not otherwise rated for such applications, largely due to maintaining POW switching.

Figure 11:
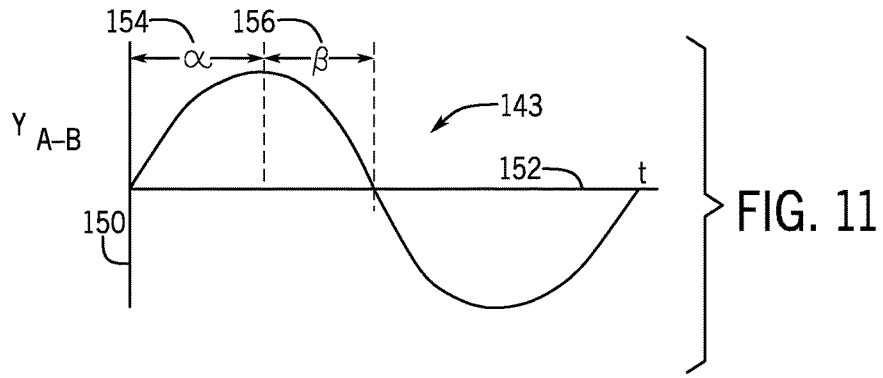
FIG. 11 is a graphical illustration of exemplary electrical angles for POW closing of the relays.

FIGS. 11-14 illustrate some of the aspects of POW switching useful for the PCB implementations contemplated here. In these embodiments, two electrical angles may be considered, a first, $\alpha$, represents a point on a phase-to-phase voltage curve (that is the relative line voltage between $\phi A$ and $\phi B$ in this case), while angle $\beta$ represents a time thereafter. On closing, for the desired POW switching, energization of the relays for $\phi A$ and $\phi B$ is controlled by selecting a desired angle $\alpha$ for closing both relays for those two phases of power, and an angle $\beta$ for closing the relay for $\phi C$. This is illustrated in FIG. 11. The phase-to-phase voltage 150 is shown against time on axis 152. The electrical angle $\alpha$ is here selected at a maximum phase-to-phase voltage occurring at a time corresponding to 90 electrical degrees in the voltage relationship (that is, $\alpha$ equals 90 degrees), as indicated by reference numeral 154. The angle $\beta$ is then chosen for closing the third phase of power, $\phi C$, as indicated by reference numeral 156. It is believed that the optimal electrical angle $\alpha$ for control of an induction motor is 90 degrees, while the optimal angle $\beta$ for an induction motor is 90 degrees.

Figure 12:
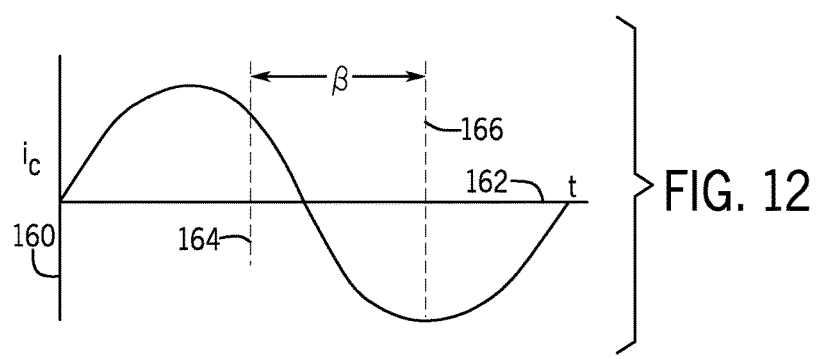
FIG. 12 is a graphical illustration of exemplary electrical angles for opening of the relays.

FIG. 12 illustrates a current waveform for the third phase, here $\phi c$, used as a basis controlling opening of the relays. Here, the current 160 is shown against time 162. At a point 164 in advance of the current zero crossing, the relay for $\phi C$ is commanded to open. Then at an angle $\beta$ thereafter, the other phases, $\phi A$ and $\phi B$, are commanded to open, as indicated at time 166. In other words, on closing represents the angle after desired time for closing the third phase, $\phi C$, after closing of the first two phases, $\phi A$ and $\phi B$, while upon opening, $\beta$ represents the angle after the opening of the third phase, $\phi C$, that the other phases, $\phi A$ and $\phi B$, are opened. In presently contemplated embodiments, and for induction motors, it is believed that for POW opening, an optimal angle $\alpha$ for opening the third phase, $\phi C$, will correspond to a zero crossing of the current for that phase (when the phase-to-phase voltage angle between the other phases, $\phi A$ and $\phi B$, will be approximately 75 degrees), with the optimal timing for $\beta$, then being 90 degrees later (although in practice the timing may be programmed without actively monitoring the phase-to-phase voltage).

Several points are of interest, however. First, these angles are subject to considerable tolerance, as discussed above, while still providing greatly enhanced performance as compared to conventional "non-POW" switching. Indeed, as noted, the use of even somewhat less than optimal POW switching enables the use of a PCB arrangements of the type described.

Secondly, the desired angles $\alpha$ and $\beta$ may not be the same for different types of loads, and it is contemplated that different switching timing may be used for such different types of load. For example, an induction motor may have different characteristics than a capacitive load (e.g., a capacitor bank) (and in some cases inertial loads may differ from non-inertial loads). It is contemplated that such differences may be taken into account by appropriately adjusting the angles $\alpha$ and $\beta$. In such cases, the load may be characterized automatically or manually upon installation or commissioning of the PCB motor controller, and the desired angles $\alpha$ and $\beta$ applied via appropriate code in the programming stored in memory and implemented by the processing circuitry. By way of example, it may be considered that nominal switching angles α and β for closing the relays for switching inductive loads may be 90 degrees and 90 degrees, respectively, while the angles may be 0 degrees and 90 degrees, respectively, for resistive and capacitive loads.

Still further, to provide the desired switching timing with respect to points in the voltage and current waveforms, the timing for application of control signals may be adjusted to anticipate these points. Some empirical testing will likely be in order for different relays (and circuit layouts) to obtain the advance in the timing desired. Once determined, control may follow based upon the desired angles and the determined advance in the timing. Of course, other adjustments, such as for temperature as discussed above, may be implemented for further refinement and consistency in the timing for opening and closing of the relays. However, for example, it is believed that although the angles for switching, and the implied timing, may be pre-selected and programmed, the actual timing may be dependent upon the tolerances, timing, performance, and su forth of the components and circuits utilized in particular applications.

Figure 13:
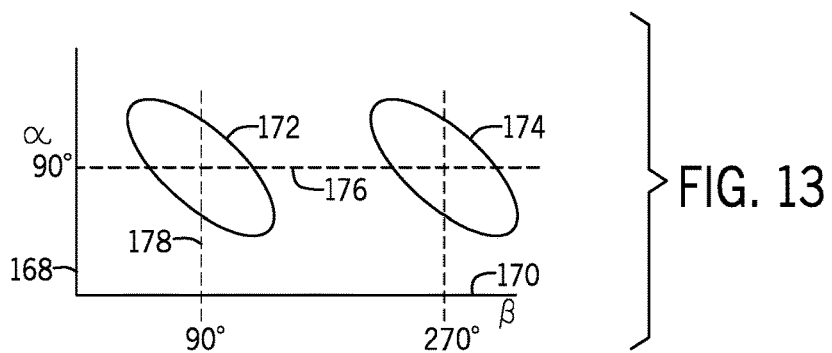
FIG. 13 is a graphical illustration of certain exemplary effects of timing in switching.

As noted, a substantial enhancement in performance may be obtained by targeting the angles α and β (adjusted and where desired for certain characterized components and circuits) with some considerable tolerance in the "tightness" (precision and accuracy) of the actual moments of opening and closing. For example, FIG. 13 shows a relationship between the angles α and β along axes 168 and 170, respectively for closing the relays for an inductive load, such as an induction motor. It may be noted that the zones 172 and 174 represent regions of enhanced performance, in this case determined based upon torque ripple of an induction motor for one phase of power upon closing. In this example, zone 172 generally surrounds a "best" combination of angles α to β of 90 electrical degrees to 90 electrical degrees, while zone 174 is effectively a cyclic repeat of the relationship at 90 degrees and 270 degrees, respectively. However, the zones appear to permit considerable tolerance in the timing. In practice, additional degradation in performance could be seen at additional zones surrounding these.

Figure 14:
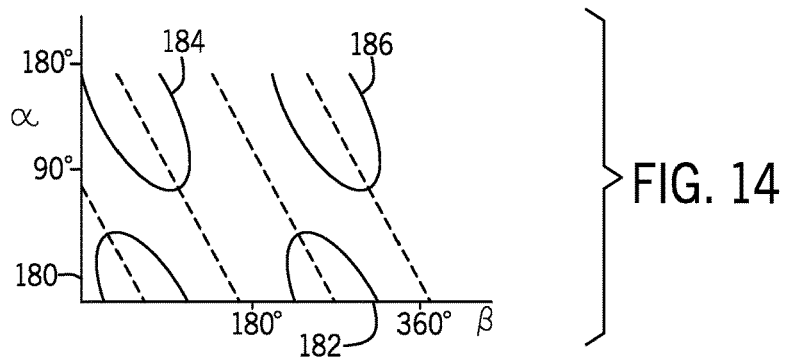
FIG. 14 is another graphical illustration of certain exemplary effects of timing in switching.

For other loads, the relationships may be considerably different. For example, FIG. 14 shows favored timing for switching of one phase in the case of a capacitive load, here with α along axis 180, and β along axis 182. The more favored timing is here represented by zones 184 and 186. However, here again considerable tolerance is seen. Also, the cyclic occurrence of the "best" zones for switching may allow for switching in the very next cycle, or waiting for such favored zones in later cycles (that is, the angles may be delayed by intervals of 180 degrees. It may also be noted that, depending upon the angles selected, adjustments may be made for component and circuit differences based upon their characterization.

But it should be noted that both for opening and closing of the relays, tolerance in the "best" electrical angles may be permitted. It should also be noted that again for both opening and closing, it may be quite useful to characterize the loads being switched, and to then judiciously select the angles α and β accordingly. Further by the use of such POW switching, as noted above, relatively smaller devices, with lower moving masses and thus lower inertias may be used, providing faster and more predictable operation, reducing arcing and degradation, and enhancing performance.

As a further enhancement and similarly to characterization of the load, in general it may be useful to characterize the electrical source as well. For example, to provide a more universal product, the frequency of the line waveforms may be selected upon installation or commissioning (e.g., manually) or may be sensed by monitoring the voltage and/or current waveforms. For example, at least two different frequencies may be anticipated, 50 Hz and 60 Hz. The timing for switching may be determined by algorithms implemented by the processing circuitry accordingly. Other frequencies may occur in other contexts, for example in vehicles or generator-produced power. It may be noted, however, that by selecting timing based upon the angles α and β, the appropriate timing will nevertheless be determined based on these angles despite the use of different input power frequencies.

Still further, it is believed that substantial improvement in life of the components, and particularly of the contacts of the relays (or other types of switching devices if used) may be obtained by monitoring of the polarity of one or more of the phases of power, and controlling switching based upon the monitored polarity. In particular, it is believed that the polarity of the power for each phase may affect the type, direction, and effects of arcs that may develop during switching, and thereby the degradation that may take place in the relays, and particularly in the stationary and movable contacts. To improve operation over time, then, the polarity (that is, the polarity of the waveform at the approach to switching) of one or more of the phases of power may be monitored, and from time to time this may be reversed by appropriate control of the switching timing. At some points during operation, then, one or more of the phases of power may be switched when approaching a desired voltage and/or current relationship with or from a first polarity (e.g., a phase-to-phase voltage peak, current zero-crossing, etc.) from a positive polarity or side of the corresponding waveform, and then the same phase or phases may be switched from the opposite, negative polarity or side of the corresponding waveform. This alternation in polarity of switching may be done based upon, for example, counting of switching events and noting from at which polarities the switches have been closed or opened.

Figure 15:
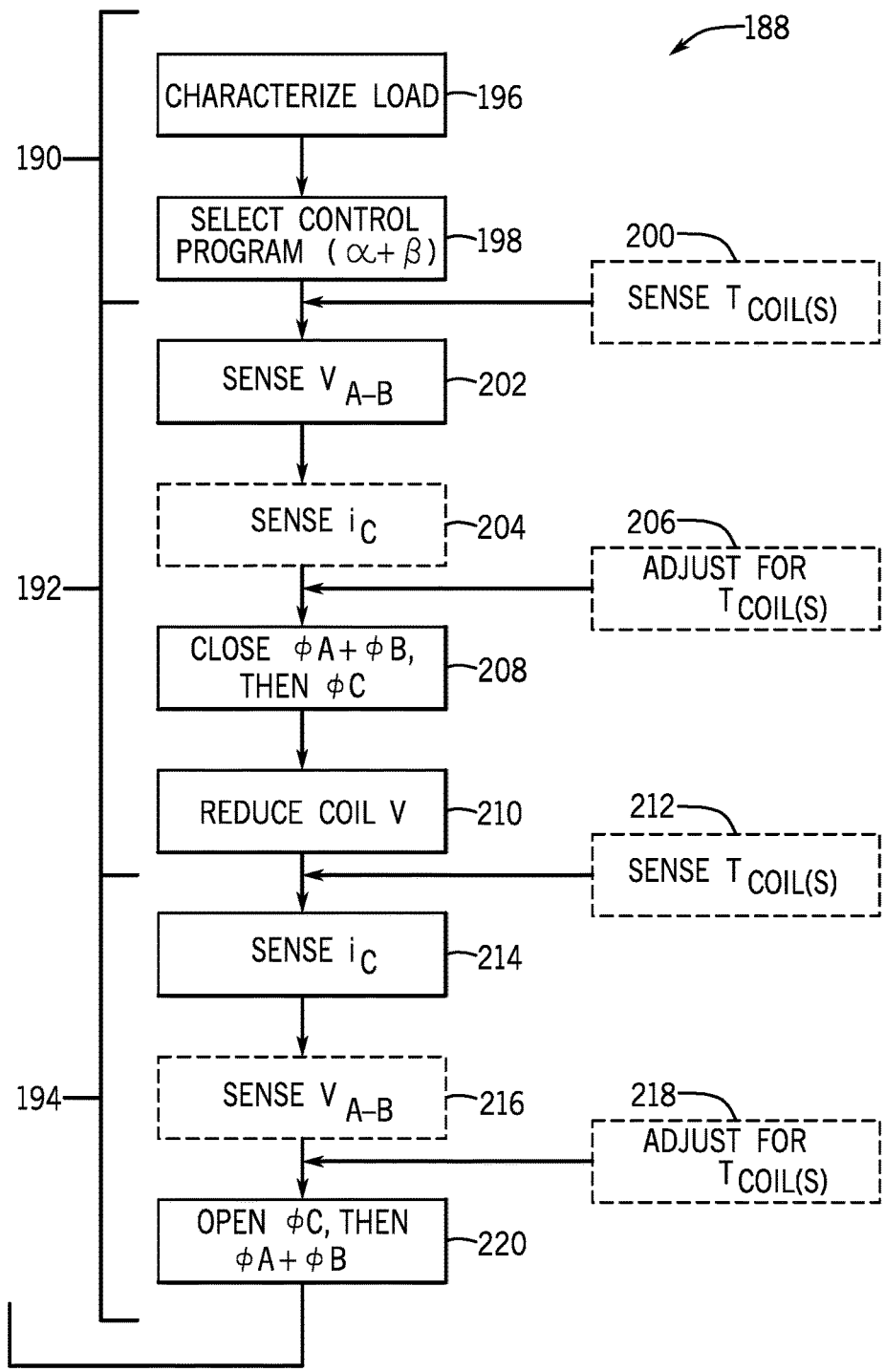
FIG. 15 is a flow chart illustrating exemplary logic for switching the relays.

FIG. 15 illustrates exemplary control logic 188 for certain operations of the PCB POW motor controller. The logic may be considered in certain phases or groups of operations, including an installation or programming or commissioning phase 190, a closing or power application to load phase 192, and an opening or power interruption phase 194. In the commissioning phase, 190, the load (and components and circuits) may be characterized, as indicated at operation 196. As noted above, this may involve selection from one of several possible pre-set options, such as for induction motors, capacitive loads, and so forth. Though not separately shown, this characterization may also involve characterization of the source power parameters (e.g., frequency). Based upon the characterization, then, the desired angles and times for switching may be computed, accessed (e.g., from a remote or onboard storage) as indicated by operation 198, and loaded for use in determining best switching times for POW operation. Where desired, certain parameters, including an indication of relay or coil temperature may be sensed as indicated by operation 200.

Then the relays of the device may be closed, based upon the desired POW switching times in phase 192. For this, as noted above, voltages of at least two phases may be monitored at operation 202, and in particular a phase-to-phase voltage is monitored between the two phases to be closed first. Optionally, at operation 204, the current of the other phase (or of more than one phase) may be monitored (although this may initially be only for fault detection insomuch as before any connections are made no current should flow). It may be noted that in practice, all of these may be cyclically sensed and monitored so that the opening and closing may occur within a very brief delay after a command is issued by an operator or control circuitry for operation of the relays. Moreover, the timing or determined signals to be applied to one or more of the relay coils may be adjusted at operation 206, such as based on the relay or coil temperature. Then at operation 208, the relays for the first two phases of power are closed, followed by the third phase, all based upon the determined POW timing. Where desired, the relay coil voltage may be reduced as indicated at operation 210 to reduce heating of the relays (and improve opening of the relays).

It should be noted that while FIG. 15 illustrates operation of only 3 relays, as noted above, a number of other relays may be mounted on and electrically controlled on the PCB, such as for wye-delta starting of a motor. When such relays are included, more complex closing and opening of the relays may be implemented at operation 208 to transition to application of power to the load.

As noted at operation 212, then, temperature can again be sensed for continued updating or correction of the relay switching timing, and so that the controller is continuously able to determine this timing is if a new switching command is received.

The controlled load should then be in steady state operation. At some point a command is received, from an operator or control circuitry, for interrupting power to the load in phase 194. As noted above, opening of the relays may be based upon the current sensed for the phase to be opened before the other two, so that this current is sensed and monitored at operation 214. The voltage of the other phases may, of course be monitored at operation 216, as mentioned above, although this may simply be optional at this point in the operation. Then at operation 218 the timing may again be adjusted, such as for the current relay or coil temperature. At operation 220, then, the third phase of power is interrupted by opening the corresponding relay, followed by opening of the other two. Of course, if special switching schemes are implemented, such as wye-delta or other sequences, the opening (and closing) of the relays present on the PCB may be controlled accordingly at operation 220.

It may be noted that a number of physical packaging options and formats may be envisioned, such as depending upon such factors as the downstream market, the products that the PCB controller may replace, the products in which it may be incorporated, and so forth. FIGS. 16A-16D show just a few examples of such packaging. In the illustration of FIG. 16A, the PCB motor controller is packaged in an enclosure 222 that may correspond to a form factor of a standard circuit breaker (e.g., with a standard 22 mm width 224). Such enclosures may be designed for mounting on standard DIN rails 226. In another example of FIG. 16B, the enclosure 228 may mimic a standard contactor package with a similar wiring layout, and also mountable on a DIN rail. Other embodiments may be designed for OEM markets, as shown in FIG. 16C. In such applications, one or more PCB motor controllers 232 and 234 may be mounted on a single PCB 230, and this may be designed to be integrated into OEM cabinets or products along with other automation or switchgear components. Due to the nature of the PCB design, a motor controller could, in this manner, be created on a common circuit board with other circuits, such as for the control of specific OEM machines. Still further, as shown in FIG. 16D, the packaging may conform to formats for other automation devices, such as in this case a safety PLC packaging 236.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor starter comprising:
a printed circuit board having three phase conductors for conveying incoming three phase power from a source and for outputting three phase power to a three-phase AC electric motor;
control circuitry mounted on and electrically coupled to the printed circuit board and receiving power from a power supply; and
three single pole relays mounted on and electrically coupled to respective phase conductors to receive the incoming power and to provide the outgoing power when closed based upon signals from the control circuitry to start the electric motor;
wherein the control circuitry is programmed to monitor a polarity of at least one of the phases of incoming power and to control timing for closing and/or opening of at least one of the relays based upon the monitored polarity;
wherein the control circuitry is configured to control switching for at least one phase of incoming power based on polarity of incoming power.

2. The motor starter of claim 1, comprising a first driver circuit mounted on the printed circuit board and coupled to the control circuitry and to two of the relays to simultaneously switch the two relays, and a second driver circuit mounted on the printed circuit board and coupled to the control circuitry and to the other relay to switch the other relay.

3. The motor starter of claim 1, comprising at least one sensor to sense current and/or voltage waveforms of the incoming power and to provide signals representative thereof to the control circuitry.

4. The motor starter of claim 3, wherein the control circuitry is configured to determine zero crossing times of a waveform and to control switching of the relays based on the zero crossing times.

5. The motor starter of claim 4, wherein the control circuitry is configured to command opening of at least one of the relays based upon a current zero crossing time.

6. The motor starter of claim 5, wherein only one phase current is sensed, and wherein the current sensed phase is opened first, and two other phases are opened simultaneously thereafter.

7. The motor starter of claim 3, wherein the control circuitry commands closure of at least one of the relays at a desired time with respect to a phase-to-phase voltage relationship.

8. The motor starter of claim 7, wherein only two phase voltages are sensed, and wherein the voltage sensed phases are closed first, and the other phase is closed thereafter.

9. The motor starter of claim 1, wherein each of the relays has a maximum rated switching current of at most 16 A at 250 VAC.

10. The motor starter of claim 1, wherein the relays are pre-packaged subassemblies each having a housing with bottom-extending contacts mounting on the printed circuit board to receive the control signals, to receive the incoming power, and to output the outgoing power.

11. The motor starter of claim 1, wherein the only switching devices of the system are only electromechanical devices.

12. A motor starter comprising:
a printed circuit board having three phase conductors for conveying incoming three phase power from a source and for outputting three phase power to a three-phase AC electric motor;
at least one current sensor that, in operation, detects current of the incoming power, and at least two voltage sensors that, in operation, detect voltage of the incoming power;
control circuitry mounted on and electrically coupled to the printed circuit board and receiving power from a power supply; and
three single pole relays mounted on and electrically coupled to respective phase conductors to receive the incoming power and to provide the outgoing power when closed based upon signals from the control circuitry to start the electric motor;
wherein the control circuitry is configured to close and open the relays in accordance with a point-on-wave switching scheme based upon sensed parameters of current and/or voltage of the incoming three phase power; and
wherein the control circuitry is programmed to monitor a polarity of at least one of the phases of incoming power based upon current and/or voltage detected by the current and/or voltage sensors, and to control timing for closing and/or opening of at least one of the relays based upon the monitored polarity;
wherein the control circuitry is configured to control switching for at least one phase of incoming power based on polarity of incoming power.

13. The motor starter of claim 12, comprising a first driver circuit mounted on the printed circuit board and coupled to the control circuitry and to two of the relays to simultaneously switch the two relays, and a second driver circuit mounted on the printed circuit board and coupled to the control circuitry and to the other relay to switch the other relay.

14. The motor starter of claim 12, comprising at least one sensor to sense current and/or voltage waveforms of the incoming power and to provide signals representative thereof to the control circuitry.

15. A motor starter comprising:
a printed circuit board having three phase conductors for conveying incoming three phase power from a source and for outputting three phase power to a three-phase AC electric motor;
at least one current sensor that, in operation, detects current of the incoming power, and at least two voltage sensors that, in operation, detect voltage of the incoming power;
control circuitry mounted on and electrically coupled to the printed circuit board and receiving power from a power supply; and
three single pole relays mounted on and electrically coupled to respective phase conductors to receive the incoming power and to provide the outgoing power when closed, the relays each having a direct current operator that receives control signals from the control circuitry to switch in accordance with a point-on-wave switching scheme to close at desired times of an AC waveform of the incoming power and thereby complete current carrying paths from the source through the power conductors to the motor;
wherein the control circuitry is programmed to monitor a polarity of at least one of the phases of incoming power based upon current and/or voltage detected by the current and/or voltage sensors, and to control timing for closing and/or opening of at least one of the relays based upon the monitored polarity;
wherein the control circuitry is configured to control switching for at least one phase of incoming power based on polarity of incoming power.

16. The motor starter of claim 15, wherein the control circuitry is configured to count switching events and to monitor the switching polarity by reference to the counts.

17. The motor starter of claim 15, wherein the control circuitry is configured to control opening of at least one of the relays based upon the monitored polarity.

18. The motor starter of claim 17, wherein the control circuitry is configured to control opening of more than one phase of incoming power.

19. The motor starter of claim 15, wherein the control circuitry is configured to control closing of at least one of the relays based upon the monitored polarity.

* * * * *